(12) United States Patent
La Pegna et al.

(10) Patent No.: US 9,476,405 B2
(45) Date of Patent: Oct. 25, 2016

(54) HORIZONTAL AXIS WIND TURBINE AND SECONDARY WIND ROTOR

(71) Applicant: ENEL GREEN POWER, S.p.A., Rome (IT)

(72) Inventors: Luigi La Pegna, Rome (IT); Renzo Piano, Rome (IT)

(73) Assignee: ENEL GREEN POWER, S.P.A., Rome (IT)

( * ) Notice: Subject to any disclaimer, the term of this patent is extended or adjusted under 35 U.S.C. 154(b) by 0 days.

(21) Appl. No.: 14/348,268

(22) PCT Filed: Sep. 28, 2012

(86) PCT No.: PCT/EP2012/069184
§ 371 (c)(1),
(2) Date: Mar. 28, 2014

(87) PCT Pub. No.: WO2013/045611
PCT Pub. Date: Apr. 4, 2013

(65) Prior Publication Data
US 2014/0232118 A1   Aug. 21, 2014

Related U.S. Application Data

(60) Provisional application No. 61/548,067, filed on Oct. 17, 2011.

(30) Foreign Application Priority Data

Sep. 30, 2011   (IT) .............................. RM2011A0516

(51) Int. Cl.
F03D 9/00        (2016.01)
F03D 1/02        (2006.01)
(Continued)

(52) U.S. Cl.
CPC .............. *F03D 1/02* (2013.01); *F03D 7/0204* (2013.01); *F03D 7/0212* (2013.01); *F03D 9/003* (2013.01); *H02J 11/00* (2013.01); *F05B 2250/313* (2013.01); *Y02E 10/723* (2013.01)

(58) Field of Classification Search
USPC ......................................................... 290/55
See application file for complete search history.

(56) References Cited

U.S. PATENT DOCUMENTS 7,454,968 B2 * 11/2008 Stein .......................... 73/170.01
2007/0046480 A1    3/2007 Stein
(Continued)

FOREIGN PATENT DOCUMENTS

CN          201159133 Y  * 12/2008
DE             1002700        7/1951
(Continued)

OTHER PUBLICATIONS

International Search Report; European Patent Office, Application No. PCT/EP2012/069184; Nov. 12, 2012; 8 pages.
(Continued)

*Primary Examiner* — Joseph Waks
(74) *Attorney, Agent, or Firm* — Thomas Horstemeyer, LLP

(57) ABSTRACT

A wind turbine for converting wind energy into electric energy using a primary and secondary pivotable wind rotor. The rotors of the wind turbine have a horizontal and a vertical axis. The secondary rotor rotates independently from the wind, enabling a continuous production of electric energy, which is advantageous in that the turbine overcomes drawbacks in intermittent wind speeds.

10 Claims, 3 Drawing Sheets

(51) Int. Cl.
*F03D 7/02* (2006.01)
*H02J 11/00* (2006.01)

(56) References Cited

U.S. PATENT DOCUMENTS

| | | | |
|---|---|---|---|
| 2009/0224607 A1* | 9/2009 | Kjaer | F03D 9/003 307/82 |
| 2011/0156392 A1 | 6/2011 | Thacker | |
| 2013/0229017 A1* | 9/2013 | Tobinaga | 290/55 |
| 2014/0103656 A1* | 4/2014 | Azegami | F03D 7/026 290/44 |
| 2015/0219072 A1* | 8/2015 | Pitre | F03D 7/0216 416/15 |

FOREIGN PATENT DOCUMENTS

| | | | |
|---|---|---|---|
| DE | 896930 | | 11/1953 |
| DE | 2742559 | | 10/1978 |
| DE | 2742559 B | * | 10/1978 |
| ES | 8306522 | | 9/1983 |
| ES | 8306522 A | * | 9/1983 |
| GB | 2067247 A | | 7/1981 |
| NL | 8204338 | | 6/1984 |
| NL | 8204338 A | * | 6/1984 |
| RU | 2207284 | | 6/2003 |
| RU | 2381379 | | 2/2010 |
| WO | WO2009133993 | | 11/2009 |

OTHER PUBLICATIONS

Chinese Office Action for application No. 2012800483167 of Dec. 28, 2015.
Russian Office Action for Application No. 2014117524 mailed May 6, 2016, with English Translation.

* cited by examiner

HORIZONTAL AXIS WIND TURBINE AND SECONDARY WIND ROTOR

CROSS-REFERENCE TO RELATED APPLICATION(S)

This application is the 35 U.S.C. §371 national stage of PCT Application No. PCT/EP2012/069184, filed Sep. 28, 2012, which is herein incorporated by reference in its entirety and which also claims priority to, and the benefit of, U.S. Provisional Application Ser. No. 61/548,067, filed Sep. 30, 2011; and which also claims priority to, and the benefit of, Italian Patent Application No. RM2011A000516, filed Oct. 17, 2011, each of which are hereby incorporated by reference herein in their entirety.

BRIEF SUMMARY OF THE INVENTION

The present description refers to the technical field of the production of electric energy and in particular it concerns a wind turbine having horizontal axis.

Renewable energy sources are increasingly widely used for the production of electric energy. In the field of renewable energy, there is currently particular interest in the conversion of wind energy into electric energy. Such conversion takes place by means of suitable electromechanical machines, called wind turbines, capable of transforming the kinetic energy of the wind into electric energy ready to be entered into an electric network. It is possible to distinguish wind turbines of two different types, in particular wind turbines with vertical axis and wind turbines with horizontal axis.

Wind turbines with horizontal axis, currently more common than those with vertical axis, generally comprise a vertical support structure, an orientable nacelle pivotably hinged to the top of the vertical support structure, a wind rotor comprising a group of blades fixed to a hub, a rotary shaft connected to the hub and an electric alternator housed inside the nacelle and adapted to convert the rotational mechanical energy of the shaft into electric energy. The wind rotor through the effect of the wind intercepted by the group of blades is such as to rotate around a generally horizontal axis, or slightly inclined to an exactly horizontal axis, to set the rotary shaft in rotation.

In the production of electric energy, for wind turbines with horizontal axis there are generally two operating thresholds, minimum and maximum, respectively, linked to the wind speed. Indeed, below a minimum wind speed, for example if such a speed is below 3 m/s, the wind rotor remains stationary, or is held immobile, and in such a condition the wind turbine does not deliver electric energy. Moreover, if the wind speed exceeds a maximum threshold, for example if it is above 25 m/s, for safety reasons and to avoid damaging the wind turbine it is foreseen to forcibly lock the wind rotor. Also in this case no electric energy is delivered. Therefore, as a function of the wind speed, generally highly variable, wind turbines, in terms of the production of electric energy, have generally intermittent operation. On the other hand, the electronic management system of the wind turbine, generally arranged at the base of the vertical support, is generally always kept fed with power and in an operating state, and therefore if the wind rotor is immobile because the wind speed is outside of the operating range between the aforementioned minimum and maximum threshold, it is foreseen to draw electric energy from the network instead of supplying electric energy. The starting operations of the wind rotor generally also involve drawing energy from the electric network.

The intermittent operation described above represents probably the greatest drawback of a wind turbine with horizontal axis.

The purpose of the present description is to provide a wind turbine that is such as to at least partially avoid the drawback described above with reference to turbines of the prior art.

Such a purpose is achieved through a wind turbine as defined in general in claim 1. Preferred and advantageous embodiments of the aforementioned wind turbine are defined in the attached dependent claims.

BRIEF DESCRIPTION OF THE DRAWINGS

The invention will become clearer from the following detailed description of a particular embodiment given as an example and, therefore, in no way limiting, in reference to the attached drawings, in which.

In the figures, elements that are the same or similar will be indicated with the same reference numerals.

DETAILED DESCRIPTION OF THE INVENTION

Figure 1:
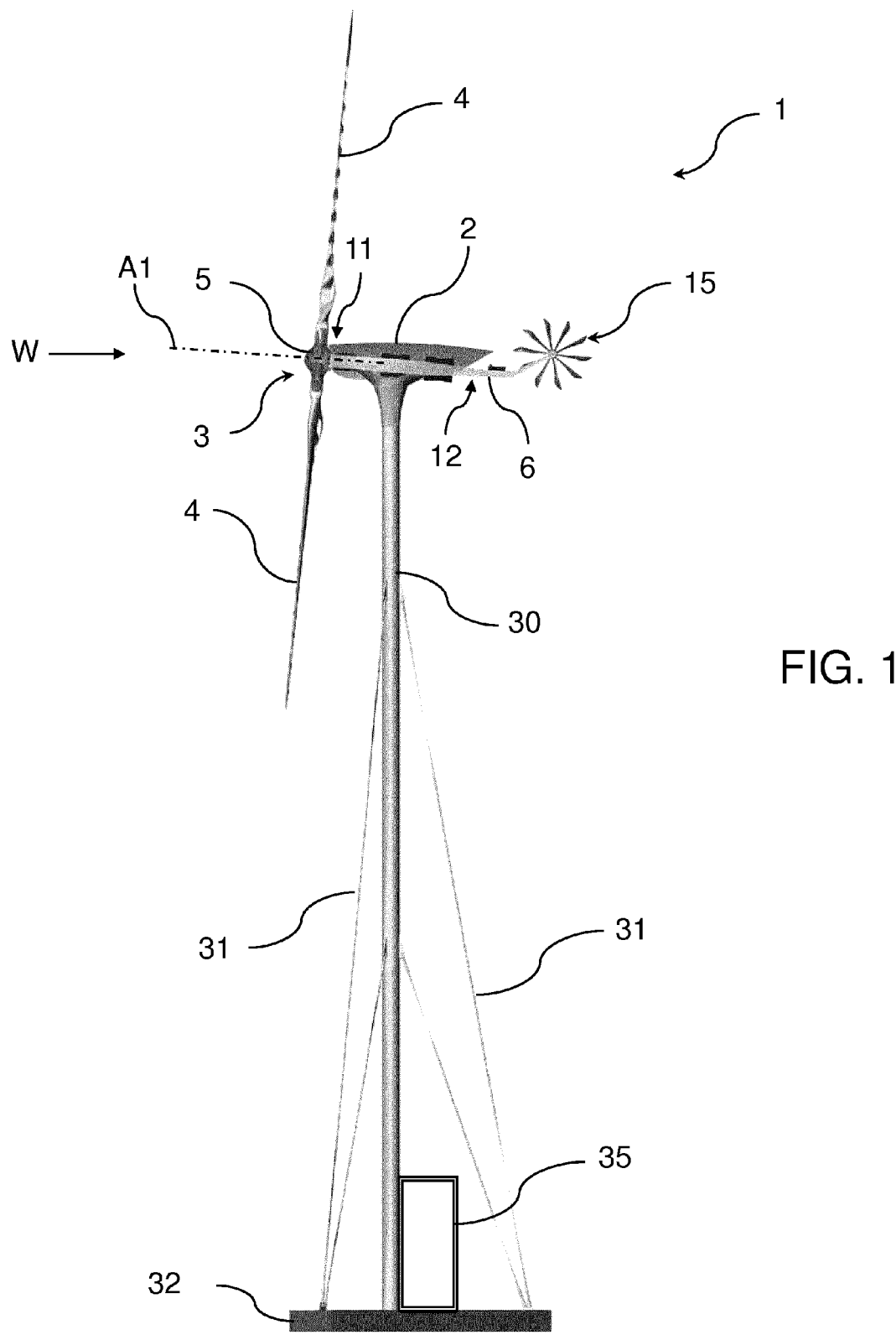
FIG. 1 shows an elevated side view of an embodiment of a wind turbine with horizontal axis comprising a nacelle, a primary wind rotor and a secondary wind rotor.

With reference to the attached figures, a non-limiting embodiment of a wind turbine with horizontal axis is shown, globally indicated with 1.

In accordance with an embodiment, without for this reason introducing any limitation, the wind turbine 1 is a so-called mini-wind turbine since it is able to develop an electric power below 200 kW, for example equal to about 50-60 kW.

The wind turbine 1 comprises a support tower 30 that in the example represented is fixed to a steelwork support base 32 and it is secured to it through a plurality of cables 31, for example made of steel. The support base 32 is for example suitable for being buried so that an upper face thereof is flush with the level of the ground.

The wind turbine 1 also comprises a nacelle 2, comprising a head portion 11 and a tail portion 12. The nacelle 2 is fixed to the top of the support tower 30 and it is for example pivotably hinged to it, so as to be able to be oriented in a controllable manner, for example through a servomotor, not shown in the figures. In accordance with a preferred embodiment, the nacelle 2 comprises a lower base portion 20 and an upper shell 22, for example shaped like a dome, fixed to the lower base portion 20. Between the upper shell 22 and the lower base portion 20 a housing space is defined suitable for housing some of the mechanical, electrical and electromechanical components of the wind turbine 1.

The wind turbine 1 comprises a primary wind rotor 3 pivotable with respect to the nacelle 2 around a primary rotational axis A1 and comprising a primary group of blades 4, a fastening hub 5 for said blades 4 projecting from the head portion 11 of the nacelle 2 and a shaft, not shown in the figures, operatively connected to the hub 5 and adapted for being rotatably moved by the primary wind rotor 3.

In accordance with an embodiment, the primary group of blades 4 has just two blades 4.

The primary rotational axis A1 is a horizontal axis. This means that such an axis A1 can be exactly horizontal or, like in the example represented, slightly inclined with respect to an exactly horizontal axis, for example inclined by about 5°.

The wind turbine 1 also comprises at least one primary electric generator comprising at least one primary electric stator integral with the nacelle 2 and a primary electric rotor integral with the shaft or operatively connected to it. The aforementioned components are not visible in the attached figures since they are housed inside the nacelle 2.

The primary electric generator is such as to convert wind energy intercepted by the primary group of blades 4 into electric energy, and in particular into alternating current electric energy.

In accordance with an embodiment, the primary electric generator is a synchronous permanent magnet generator capable of developing a unitary nominal power of about 50 kW.

In accordance with a further embodiment, the primary electric generator includes two generators arranged aligned, for example each capable of developing a unitary nominal power of about 27 kW.

The wind turbine 1 also comprises an electrical box 35, comprising an AC/DC/AC converter for the connection of the wind turbine 1 to an electric network into which the electric energy produced by the primary electric generator is inserted. From such an electric network the electric energy necessary for the operation of the wind turbine 1 is also optionally taken, for example to supply power to the electrical box 35, to feed power to the actuators comprised in the wind turbine, for example for the actuator foreseen to controllably orient the nacelle in order to maximise/optimise the production of electric energy.

The AC/DC/AC converter is for example a static converter in back to back configuration and it is such as to make the alternating current electric energy supplied by the primary wind turbine compatible with the characteristics imposed by the electric network. In the electrical box 35 it is optionally possible to house the control electronics of the wind turbine 1, intended to manage/control the operation of the wind turbine 1 itself and optionally to remotely collect and transmit status information of the wind turbine 1. In a per se known way, the electrical box 35 is operatively connected to the nacelle 2 through electrical through cables through the support tower 30.

Figure 2:
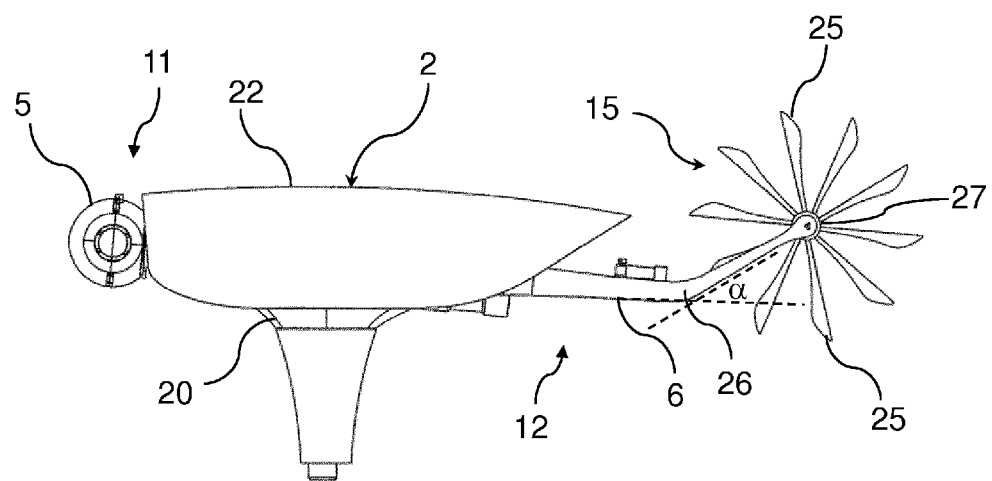
FIG. 2 shows an elevated side view of the nacelle and of the secondary wind rotor of the turbine of FIG. 1.
Figure 3:
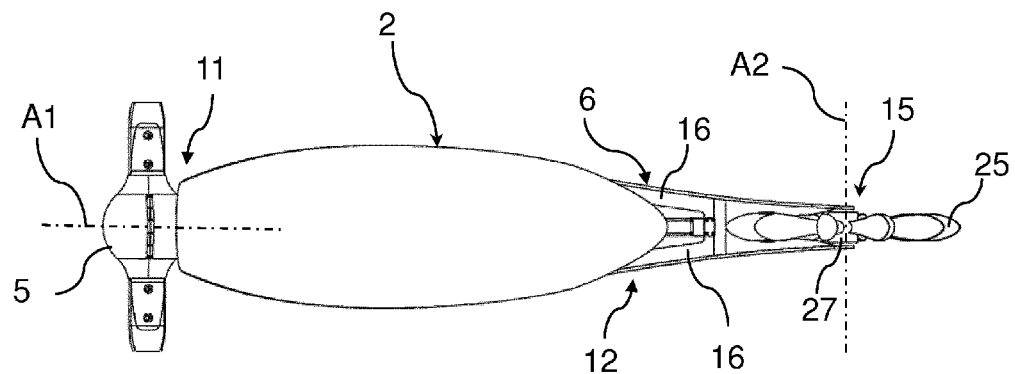
FIG. 3 shows a plan view from above of the nacelle and of the secondary wind rotor of the turbine of FIG. 1.
Figure 4:
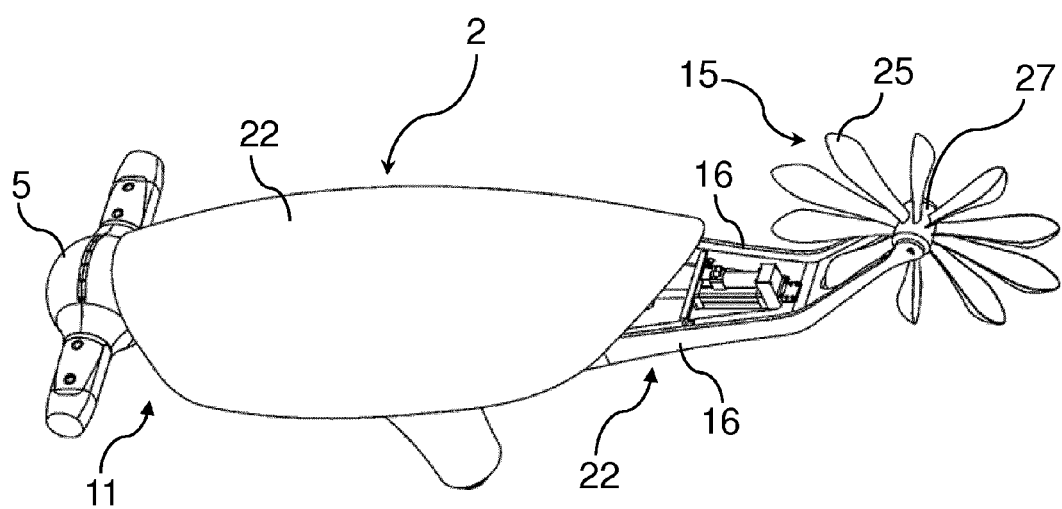
FIG. 4 shows a perspective view of the nacelle and of the secondary wind rotor of the turbine of FIG. 1.

The wind turbine 1 also comprises an auxiliary wind rotor 15 pivotably hinged to the tail portion 12 and comprising a secondary group of blades 25 pivotable around a secondary rotation axis A2 perpendicular to the primary rotational axis A1. In accordance with a preferred embodiment, the secondary axis A2 is arranged, with respect to the level of a surface for installing the wind turbine 1, at a greater height with respect to the primary axis A1. According to a further embodiment, as is clearly shown in FIGS. 1-3, the secondary rotation axis A2 is an horizontal axis.

In the particular example represented, the secondary wind rotor comprises, without for this reason introducing any limitation, a group made up of ten blades 25. In accordance with an embodiment, such blades 25 are concave on one side and convex on the opposite side and are essentially spoon shaped. In the particular example represented in the figures, the blades 25 of the secondary group of blades also have a shape that in plan is essentially similar to a droplet or to a petal. The aforementioned blades 25 project from a cylindrical central hub 27 to which they are stably fixed.

In accordance with an embodiment, the tail portion 12 of the nacelle 2 comprises a fork 6 having two support arms 16. For example, the fork 6 is fixed to the lower base portion 20 of the nacelle 2. The auxiliary wind rotor 15, and in particular its cylindrical central hub 27, is pivotably hinged to the fork 6 being fixed between said support arms 16. In accordance with an advantageous embodiment, each of the support arms 16 of the fork 6 is bent so as to have an elbow 26, foreseen to decentre the secondary wind rotor with respect to the nacelle 2. For example, such an elbow is such that each of the arms 26 is bent by an angle α equal to about 30°.

In accordance with a further embodiment, the secondary wind rotor 15 comprises a secondary electric rotor, for example contained inside the cylindrical central hub 27 and not visible in the figures. The wind turbine 1 comprises a secondary electric generator comprising the aforementioned secondary electric rotor and a secondary electric stator integral with the tail portion 12 of the nacelle 2 and not visible in the figures. The secondary electric stator is relatively inside the aforementioned secondary electric rotor, therefore arranged inside the cylindrical central hub 27, and it is adapted to cooperate with the secondary electric rotor to convert the wind energy intercepted by the secondary wind rotor into electric energy. For example, the secondary electric generator is a permanent magnet generator. In accordance with an embodiment, such a secondary electric generator is capable of supplying electric energy with a nominal power of about 1 kW.

In accordance with an embodiment, the secondary electric generator is connected to the electric network, for example through the electrical box 35 itself. In this case, the AC/DC/AC converter comprised in the electrical box 35 has a first inlet adapted for receiving alternating current electric energy produced by the rotation of the primary wind rotor 3, and therefore by the primary electric generator, and it has an auxiliary inlet adapted for receiving alternating current electric energy produced by the rotation of the secondary wind rotor 15 and therefore by the secondary electric generator.

With reference to FIG. 1, in accordance with an embodiment the nacelle 2 is orientable and when it is oriented so that the main axis A1 is oriented along a prevailing direction of the wind W, the secondary axis A2 is arranged with respect to the nacelle 2 at a height such that the nacelle 2 is such as to partially shield the secondary wind rotor 15 from the wind in an asymmetric manner with respect to the secondary axis A2. For example, it is possible, as represented in the attached figures, to foresee for the secondary wind rotor 15 to be arranged at a height such that half, or about half, of said secondary wind rotor 15 projects upwards above the nacelle 2, or rather above the upper shell 22 of the nacelle 2.

In operation, the system under the supervision of the control electronics operates so that the primary wind rotor 3, like in wind turbines of the state of the art, can only rotate if the characteristics of the wind satisfy predetermined conditions, with particular reference to the minimum and maximum operating thresholds described above. The secondary wind rotor 15, also called tail rotor, on the other hand having a smaller mass and involving less safety problems with respect to the primary wind rotor 3, can be made to rotate independently from the characteristics of the wind, determining a continuous production of electric energy that at least counterbalances or partially compensates the electric energy taken from the network for the operation of the wind turbine 1 itself, with particular reference for example to the energy necessary for the orientation of the nacelle 2 or to the inrush energy necessary to set the blades 5 of the primary wind rotor 3 in motion, etc. Moreover, advantageously, the tail rotor 15 makes it possible to have the impression that in any case the wind turbine 1 is a machine that is always working and operative, even when the primary wind rotor 3 is stationary and this certainly contributes to improving opinion and the community with regard to this type of machines, at times criticised precisely because they are immobile and have a negative impact in terms of appearance and fitting into the landscape.

From the description that has just been made it is possible to understand how a wind turbine of the type described above achieves the predetermined purposes and therefore is capable of overcoming or at least minimising the drawbacks described above with reference to wind turbines of the prior art.

Of course, a man skilled in the art can bring numerous modifications and variants to the wind turbine described above, in order to satisfy contingent and specific requirements, all of which are in any case covered by the scope of protection of the invention, as defined by the following claims.

The invention claimed is:

1. A wind turbine for converting wind energy into electric energy, comprising:
   a nacelle comprising a head portion and a tail portion;
   a primary wind rotor pivotable with respect to the nacelle around a primary rotational axis and comprising a primary group of blades, a fastening hub for said blades projecting from the head portion of the nacelle and a shaft adapted for being rotatably moved by the primary wind rotor;
   at least one primary electric generator comprising at least a primary electric stator stably fixed to the nacelle and a primary electric rotor stably fixed to the shaft or operatively connected to said shaft, the primary electric generator being adapted to convert wind energy intercepted by the primary group of blades into electric energy;
   wherein the wind turbine further comprises a secondary wind rotor pivotably hinged to the tail portion and comprising a secondary group of blades pivotable around a secondary axis perpendicular to the primary rotational axis;
   wherein the tail portion comprises a fork having two support arms and wherein the auxiliary wind rotor is rotatably hinged to the fork being fastened between said support arms; and
   wherein each of said support arms is bent so as to have an elbow.

2. The wind turbine according to claim 1, wherein the secondary wind rotor comprises a secondary electric rotor and wherein the wind turbine comprises a secondary electric generator comprising said secondary electric rotor and a secondary electric stator stably fixed to the tail portion, relatively internal with respect to said secondary electric rotor and adapted to cooperate with the secondary electric rotor for converting wind energy intercepted by said secondary wind rotor into electric energy.

3. The wind turbine according to claim 2, wherein said secondary electric generator is a permanent magnet generator.

4. The wind turbine according to claim 1, wherein the nacelle can be oriented and wherein, when said nacelle is oriented in such a way that said main axis is oriented along a prevailing direction of the wind, the secondary rotational axis is arranged with respect to the nacelle at such a height that the nacelle can partially shield the secondary wind rotor from the wind in an asymmetrical way with respect to the secondary rotational axis.

5. The wind turbine according to claim 1, wherein the secondary rotational axis is arranged, with respect to a level of a surface for installing the wind turbine, at a height higher than the primary rotational axis.

6. The wind turbine according to claim 1, wherein the nacelle comprises a lower base portion and an upper shell fastened to the lower base portion, wherein the secondary wind rotor is arranged at such a height that one half, or about one half, of the secondary wind rotor projects in height above the upper shell.

7. The wind turbine according to claim 1, wherein the fork is fastened to a lower base portion of the nacelle.

8. The wind turbine according to claim 1, wherein said secondary axis is an horizontal axis.

9. The wind turbine according to claim 1, wherein the wind turbine is adapted to be connected to an electric network, and wherein the wind turbine further comprises an electrical box containing an AC/DC/AC converter adapted to make the alternate current electric energy supplied by the primary electric generator compliant with specifications imposed by said electric network, the AC/DC/AC converter comprising a first inlet adapted to receive alternate current electric energy produced by the rotation of the primary wind rotor and an auxiliary inlet adapted to receive alternate current electric energy produced by the rotation of the secondary wind rotor.

10. The wind turbine according to claim 1, wherein the two support arms are located on opposite sides of the auxiliary wind rotor.

* * * * *